United States Patent
Nichols et al.

(10) Patent No.: US 11,466,833 B2
(45) Date of Patent: Oct. 11, 2022

(54) LIGHTING SYSTEM

(71) Applicant: AVID Labs, LLC, Fort Wayne, IN (US)

(72) Inventors: Joel A. Nichols, Columbia City, IN (US); Dominic Picciuto, Crestview Hills, KY (US); Michael F. Esmonde, Orlando, FL (US); Andrew Trenton, Fort Wayne, IN (US)

( * ) Notice: Subject to any disclaimer, the term of this patent is extended or adjusted under 35 U.S.C. 154(b) by 0 days.

(21) Appl. No.: 17/475,218

(22) Filed: Sep. 14, 2021

(65) Prior Publication Data

US 2022/0003379 A1    Jan. 6, 2022

Related U.S. Application Data

(63) Continuation-in-part of application No. 17/111,605, filed on Dec. 4, 2020, now abandoned, and a continuation-in-part of application No. 17/076,738, filed on Oct. 21, 2020.

(60) Provisional application No. 62/943,560, filed on Dec. 4, 2019, provisional application No. 62/924,363, filed on Oct. 22, 2019.

(51) Int. Cl.
| | |
|---|---|
| *F21S 45/00* | (2018.01) |
| *F21S 41/663* | (2018.01) |
| *F21L 4/02* | (2006.01) |
| *F21S 43/13* | (2018.01) |
| *F21W 107/13* | (2018.01) |

(52) U.S. Cl.
CPC ............. *F21S 41/663* (2018.01); *F21L 4/025* (2013.01); *F21S 43/13* (2018.01); *F21S 45/00* (2018.01); *F21W 2107/13* (2018.01)

(58) Field of Classification Search
CPC .......... F21S 41/664; F21S 43/13; F21S 45/00; F21L 4/025; F21W 2107/13; H05B 45/10; H05B 47/10
See application file for complete search history.

(56) References Cited

U.S. PATENT DOCUMENTS

| | | |
|---|---|---|
| 4,088,882 A | 5/1978 | Lewis |
| 4,170,337 A | 10/1979 | Davis |
| 4,390,927 A | 6/1983 | Von Feldt |
| 4,541,555 A | 9/1985 | Miree |
| 4,970,628 A | 11/1990 | Bergkvist |

(Continued)

OTHER PUBLICATIONS

Robe, UV StrobeTM, Eye—Popping UV Effects with visible indigo flow combined with bright white strobe-blinder effect is making this product a truly unique on the market.

*Primary Examiner* — Jimmy T Vu (57) ABSTRACT

A lighting device is attached to a vehicle and includes a forward facing visible light source that emits visible light in a forward direction relative to the vehicle. The lighting device further includes a rearward facing ultraviolet light source that emits ultraviolet light in a rearward direction relative to the vehicle, such that a reflecting material of an object, which is not illuminated by the visible light source, is illuminated by the ultraviolet light source. A control device is connected to the light sources, and is configured to turn the light sources on and off. A light sensor is connected to the control device and is configured to sense ambient light and to provide a signal to the control device. The control device is configured to turn the ultraviolet light source on and off responsive to the signal of the light sensor.

20 Claims, 7 Drawing Sheets

(56) References Cited

U.S. PATENT DOCUMENTS

| | | | |
|---|---|---|---|
| 5,255,163 | A | 10/1993 | Neumann |
| 5,704,707 | A | 1/1998 | Gebelein |
| 6,122,093 | A | 9/2000 | Lynam |
| 6,997,584 | B1 | 2/2006 | Rothan |
| 10,076,993 | B2 | 9/2018 | Nichols |
| 10,857,470 | B2 | 12/2020 | Lo et al. |
| 2002/0048169 | A1 | 4/2002 | Dowling |
| 2004/0105264 | A1 | 6/2004 | Spero |
| 2004/0170014 | A1 | 9/2004 | Pritchard |
| 2006/0221603 | A1* | 10/2006 | Zazzara, Sr. .............. F21L 2/00 362/187 |
| 2008/0218998 | A1 | 9/2008 | Quest |
| 2017/0167706 | A1 | 6/2017 | Yang |
| 2019/0162381 | A1 | 5/2019 | Estes |

* cited by examiner

Fig. 13

LIGHTING SYSTEM

CROSS REFERENCE TO RELATED APPLICATIONS

This is a Continuation-In-Part claiming priority to U.S. non-provisional application Ser. No. 17/111,605 entitled "LIGHTING SYSTEM", filed Dec. 4, 2020, which is based upon U.S. provisional patent application Ser. No. 62/943,560, entitled "LIGHTING SYSTEM", filed Dec. 4, 2019. This Continuation-in Part also claims priority to U.S. non-provisional application Ser. No. 17/076,738 entitled "LIGHTING SYSTEM", filed Oct. 21, 2020, which is based on U.S. provisional patent application Ser. No. 62/924,363 entitled "LIGHTING SYSTEM", filed Oct. 22, 2019, each of which is incorporated herein by reference.

BACKGROUND OF THE INVENTION

1. Field of the Invention

The invention relates to lighting systems, and, more particularly, to a lighting system for a transportation device which emits both visible light and non-visible light.

2. Description of the Related Art

Low-light conditions may present a hazard to individuals who are not well-lit. Personal protective equipment, such as a reflective clothing, is often used to promote visibility. However, personal protective equipment may not be effective if such equipment is not sufficiently illuminated. Thereby, individuals may need to be sufficiently illuminated by various auxiliary lights. Some auxiliary lights may include light emitting diodes (LEDs). The introduction of LED lighting technology has reduced much of the ultraviolet (UV) radiation emitted from an artificial source to near zero. While the efficiency of the LED lighting is very desirable, the use thereof alters the spectral breadth of the light being produced. The lack of UV light degrades the effectiveness of safety markings placed on equipment, vehicles, and clothing worn by operators or security personnel, in that many of such markings are designed to fluoresce, which requires the presence of UV spectral power.

UV light is an electromagnetic radiation with a wavelength from roughly 10 nm (30 PHz) to 380 nm (750 THz), which is a shorter wavelength than that of visible light but longer than X-rays. UV radiation is present in sunlight, and also produced by electric arcs and specialized lights such as mercury-vapor lamps, tanning lamps, and black lights. Although the UV light lacks the energy to ionize atoms, long-wavelength ultraviolet radiation can influence chemical reactions, and causes many substances to glow or fluoresce. Therefore, known artificial lighting systems may ineffectually illuminate equipment or individuals in low-light conditions.

Accordingly, there is an unmet need for a lighting system for providing needed rearward facing ultraviolet radiation in conjunction with forward facing visible light to improve visibility of equipment and individuals in low light conditions.

SUMMARY OF THE INVENTION

The invention provides a lighting system that includes a lighting device for emanating visible light in a forward direction and ultraviolet light in a rearward direction. In one embodiment, the lighting device may be a lighting device which is removably mounted on a transportation device. The lighting device may include a body, at least one visible light source connected to the body, and at least one ultraviolet light source connected to the body. The at least one ultraviolet light source can illuminate one or more objects in a rearward direction, including clothing of the operator of the transportation device, workers and other personnel behind the transportation device, and other objects having reflectance materials to the rear of the transportation device. In another embodiment, the lighting device may include a control device for strobing or flashing the forward facing visible light and the rearward facing ultraviolet light on and off. When the forward facing visible light is off, the rearward facing ultraviolet light is turned on in order to provide a secondary or additional light which radiates from a reflectance material of an object.

The invention in one form is directed to a lighting device configured to be attached to a transportation device. The lighting device includes a body. The lighting device further includes at least one forward facing visible light source connected to the body. The forward facing visible light source is configured to emit visible light in a forward direction relative to the transportation device. The lighting device further includes at least one rearward facing ultraviolet light source connected to the body. The rearward facing ultraviolet light source is configured to emit ultraviolet light in a rearward direction relative to the transportation device such that a reflectance material of an object, which is not illuminated by the forward facing visible light source, is illuminated by the rearward facing ultraviolet light source. A control device is operably connected to the forward facing visible light source and to the rearward facing ultraviolet light source. The control device is configured to turn on and off the forward facing visible light source and the rearward facing ultraviolet light source. At least one light sensor is operably connected to the control device. The light sensor is configured to sense ambient light and to provide a signal to the control device. The control device is configured to turn the rearward facing ultraviolet light source on and off responsive to the signal of the light sensor.

The invention in another form is directed to a transportation device having a lighting device attached thereto. The lighting device includes a body. The lighting device further includes at least one forward facing visible light source connected to the body. The forward facing visible light source is configured to emit visible light in a forward direction relative to the transportation device. The lighting device further includes at least one rearward facing ultraviolet light source connected to the body. The rearward facing ultraviolet light source is configured to emit ultraviolet light in a rearward direction relative to the transportation device such that a reflectance material of an object, which is not illuminated by the forward facing visible light source, is illuminated by the rearward facing ultraviolet light source. A control device is operably connected to the forward facing visible light source and to the rearward facing ultraviolet light source. The control device is configured to turn on and off the forward facing visible light source and the rearward facing ultraviolet light source. At least one light sensor is operably connected to the control device. The light sensor is configured to sense ambient light and to provide a signal to the control device. The control device is configured to turn the rearward facing ultraviolet light source on and off responsive to the signal of the light sensor.

The invention in another form is directed to a method for illuminating an area and/or an object. The method includes several steps. The first step is providing a transportation device and a lighting device attached to the transportation device. The lighting device includes a body, at least one forward facing visible light source connected to the body, and at least one rearward facing ultraviolet light source connected to the body. The second step is operably connecting a control device to the forward facing visible light source and to the rearward facing ultraviolet light source. The third step is configuring the control device to turn on and off the forward facing visible light source and the rearward facing ultraviolet light source. The fourth step is operably connecting at least one light sensor to the control device. The fifth step is configuring the light sensor to sense ambient light and to provide a signal to the control device. The sixth step is configuring the control device to turn the rearward facing ultraviolet light source on and off responsive to the signal of the light sensor. The seventh step is emitting visible light in a forward direction relative to the transportation device by activating the forward facing visible light source. The eight step is emitting ultraviolet light in a rearward direction relative to the transportation device by activating the rearward facing ultraviolet light source such that a reflectance material of the object, which is not being illuminated by the forward facing visible light source, is illuminated by the rearward facing ultraviolet light source;

An advantage of the invention is that the lighting system dually emits UV light and visible light for illuminating an area in front of the individual and transportation device and illuminating an object being worn by the individual. Another advantage of the invention is that the lighting system is that the UV light and the visible light emit in opposing directions for illuminating the individual and an area in front of the individual. Another advantage of the invention is that the lighting system dually emits UV light and visible light. Another advantage of the invention is that the lighting system prolongs the life of the UV light.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplification are not to be construed as limiting the scope of the invention in any manner.

DETAILED DESCRIPTION OF THE INVENTION

The following detailed description and appended drawing describe and illustrate various exemplary embodiments of the invention. The description and drawings serve to enable one skilled in the art to make and use the invention, and are not intended to limit the scope of the invention in any manner. In respect of any methods disclosed and illustrated, the steps presented are exemplary in nature, and thus, the order of the steps is not necessary or critical. As used herein, the term visible light refers to the spectrum of light which the human eye can see without the aid of some device. The term non-visible light refers to what the human eye cannot see without the aid of some device. The term ultraviolet (UV) light refers to electromagnetic radiation with a wavelength from roughly 10 nm (30 PHz) to 380 nm (750 THz).

Figure 1:
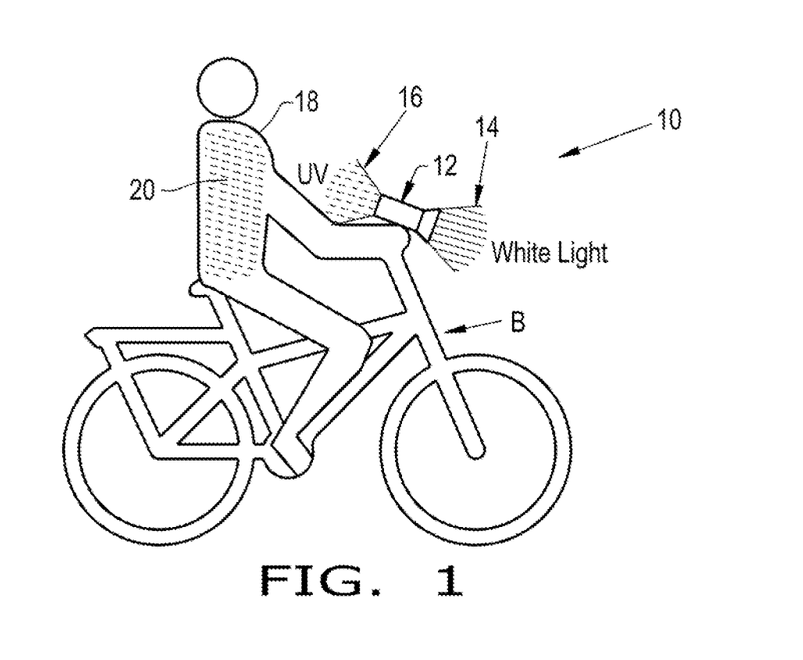
FIG. 1 is a schematic view of a lighting system according to an embodiment of the invention, wherein the lighting system is removably coupled to a transportation device and is operating in a dual state for emanating nonvisible and visible light.
Figure 2:
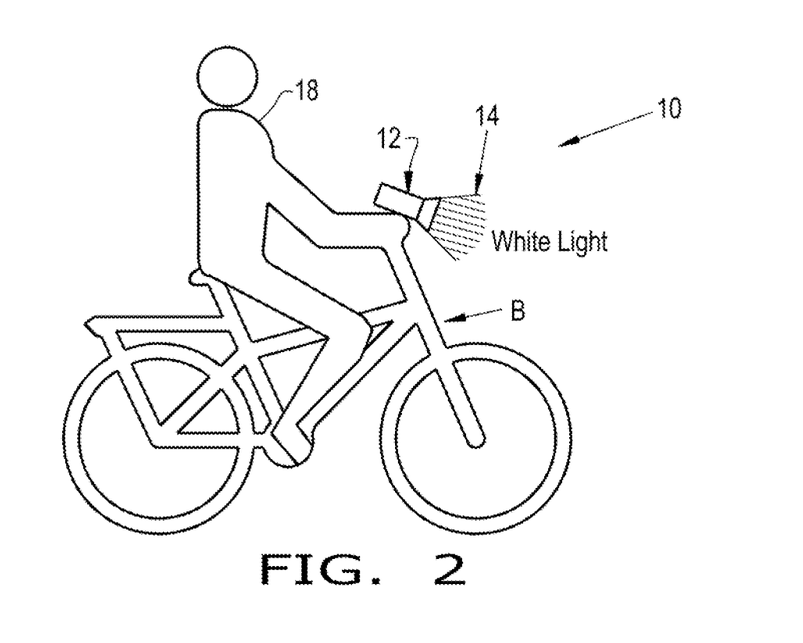
FIG. 2 is a schematic view of the lighting system of FIG. 1, wherein the lighting system is operating in a visible light state for emanating only visible light.

Referring now to the drawings, and more particularly to FIGS. 1 and 2, a lighting system 10 is shown in schematic form. The lighting system 10 may be in the form of a light source 12 that may be removably mounted to a transportation device, such as a gas or electric powered vehicle, or a man-powered vehicle. The transportation device may, for non-limiting example, be in the form of a bicycle B. The light source 12 has a body and emits visible light 14 and non-visible light 16. The non-visible light 16 may be in the form of UV light 16.

When UV light 16 illuminates and interacts with reflectance material(s) 18, the reflectance material(s) 18 will convert UV light 16 into visible light 20 to enhance the visibility of the operator, individuals, and/or objects, including the bicycle B. A reflectance material 18 may include any desired material, paint, coating, fabric, etc., which phosphors, i.e., emits visible light upon absorbing UV radiation. It should be appreciated that an object may include any desired object or thing, personnel, and/or animal. For example, the object may be in the form of an article of clothing, such as a safety vest or shirt, worn by the individual. Additionally, for example, the object may be in the form of markings on the bicycle B. By way of example only, the rider of bicycle B is shown wearing an article of clothing with reflectance materials 18, and the UV light 16 interacts with reflectance materials 18 such that reflectance materials 18 convert UV light 16 into visible light 20 to enhance the visibility of the operator.

In FIG. 1, the lighting system 10 is shown to be operating in a dual state for emanating both visible light 14 and non-visible light 16. In FIG. 2, the lighting system 10 is shown to be operating in a visible light state for emanating only visible light 14. The lighting system 10 may be in the form of a handheld or wearable device which may be carried by an individual or used on one or more transportation devices. Thereby, the lighting system 10 may be removably connected to a transportation device. The light source 12 may again have vehicle and non-vehicle applications. The lighting system 10 may have one or more mating features which couple to one or more mating features on the transportation device. For instance, the lighting system 10 may have rail members which interact with channels in a mount affixed to the bicycle B. Additionally and/or alternatively, the lighting system 10 may be removably connected to the transportation device via one or more fasteners, e.g. screws, Velcro®, and etcetera. The lighting system 10 has a selectable emission of UV light 16 and visible light 14. It should be appreciated that the lights may also be directed by one or more light directing devices, e.g. cones.

Figure 3:
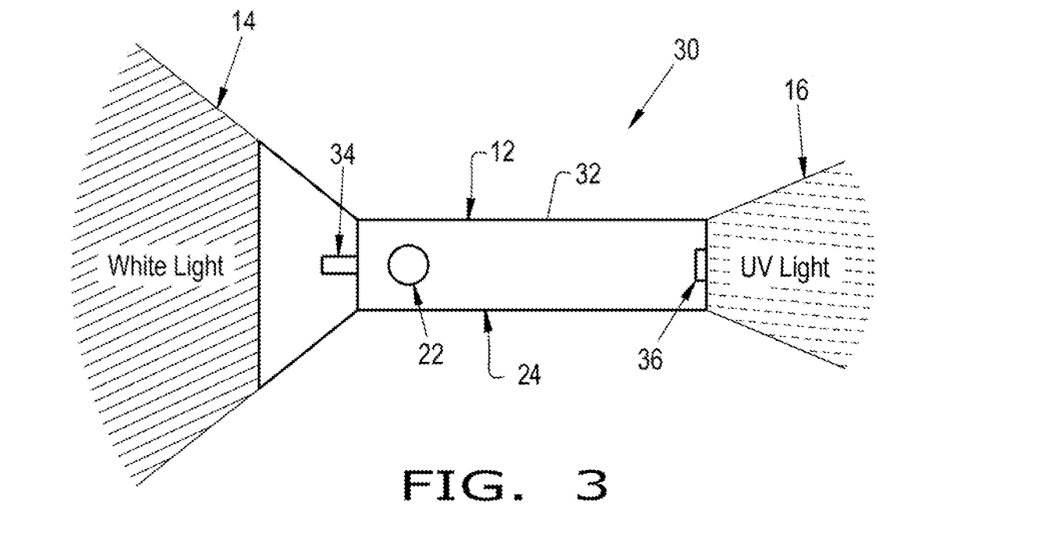
FIG. 3 is a schematic view of another embodiment of a lighting system, wherein the lighting system is in the form of a handheld flashlight which can be removably coupled to a transportation device.

Now, referring to FIG. 3, there is shown another embodiment of a lighting system 30. In the lighting system 30, the light source 12 is in the form of a handheld flashlight 32. The handheld flashlight 32 includes a body 24 and light(s) 34 and 36, e.g. light emitting diodes (LEDs), which respectively emit the visible light 14 and nonvisible light 16. The handheld flashlight 32 includes a control 22 that selectively turns on/off the visible light 14 and the non-visible light 16. The control 22 may be in the form of a switch or button 22 connected to the body 24.

The flashlight 32 may include one or more LEDs 34 for emitting visible light 14 and one or more LEDs 36 for emitting nonvisible light 16. The LEDs 34 and 36 may be connected to the opposing ends of the body 24. Thus, the lights 14 and 16 may emanate from opposite ends of the body 24 of the light source 12. The ends of the flashlight 32 may have one or more light directing devices, e.g. cones, for directing the visible light 14 and nonvisible light 16. The LED(s) 36 may include a widened spectrum including UV light emitting sources and visual light emitting sources, for example, with a spectrum from 360 nm to 385 nm, for example from 360 nm to 670 nm. The lights 34 and 36 can be connected to the body 24 of the lighting device in any desired fashion. The lights 34 and 36 may be positioned within or on the body 24 of the light source 12 at any desired location. If multiple lights are including in the handheld flashlight 32, the visible lights 34 or the UV lights 36 may be positioned on a common substrate or die. It should be appreciated that lights 14 and 16 may be emitted by any desired light sources.

The handheld flashlight 32 may include one or more mating features and/or fasteners which removably engage with one or more mating features and/or fasteners on the bicycle B. Additionally, the handheld flashlight 32 may not include a designated mating feature and may instead fit within a corresponding mount, e.g. clip, recess, or other receiving member, on the bicycle B.

Figure 4:
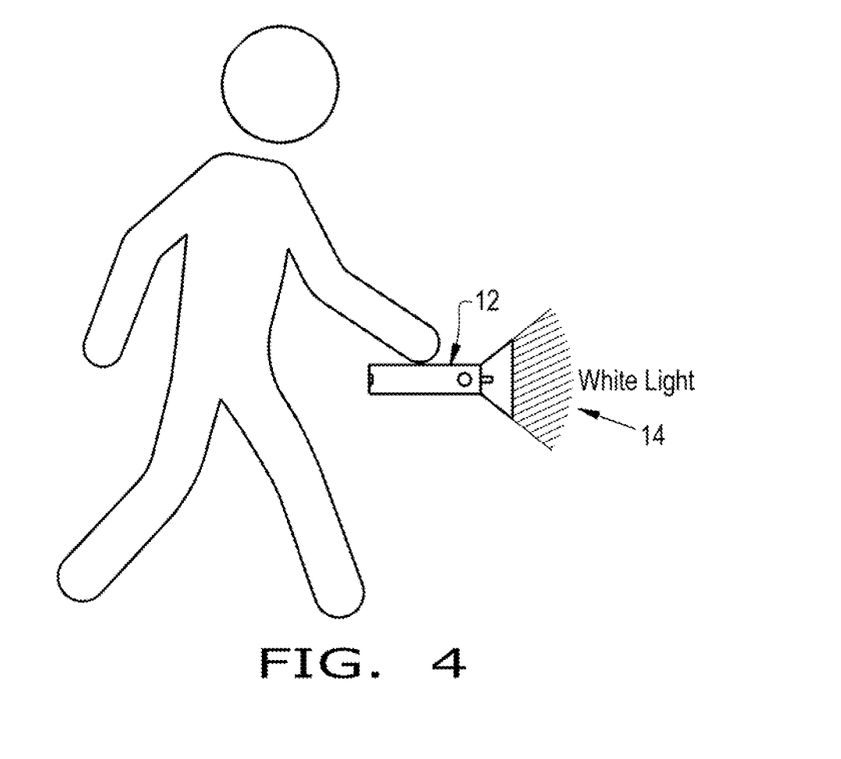
FIG. 4 is a schematic view of the lighting system of FIG. 3, wherein the lighting system is carried by an individual and the lighting system is operating in the visible light state.
Figure 5:
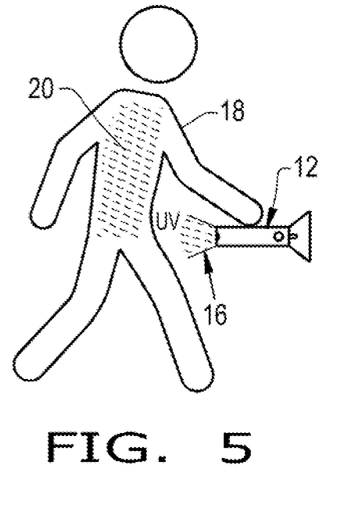
FIG. 5 is a schematic view of the lighting system of FIGS. 3-4, wherein the lighting system is carried by the individual and the lighting system is operating in a nonvisible light state for emanating only nonvisible light.
Figure 6:
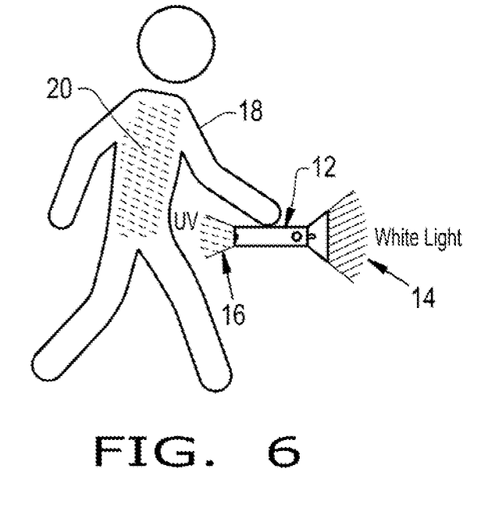
FIG. 6 is a schematic view of the lighting system of FIGS. 3-5, wherein the lighting system is carried by the individual and the lighting system is operating in the dual state.

Now, additionally referring to FIGS. 4 through 6, there are shown three different states of the light source 12. In FIG. 4, only visible light 14 is illuminated. In FIG. 5, only nonvisible light 16 is illuminated. A combination of lights 14 and 16 are both shown illuminated in FIG. 6. In FIGS. 5 through 6, UV light 16 is causing the reflectance material 18 to be illuminated causing visible light 20 to emanate from reflectance material 18. It should also be appreciated that the handheld flashlight 32 may be powered by any desired power source. For example, the handheld flashlight 32 may be powered by one or more batteries. Additionally, for example, the handheld flashlight 32 may be selectively connectable to an electric power source of the transportation device.

Figure 7:
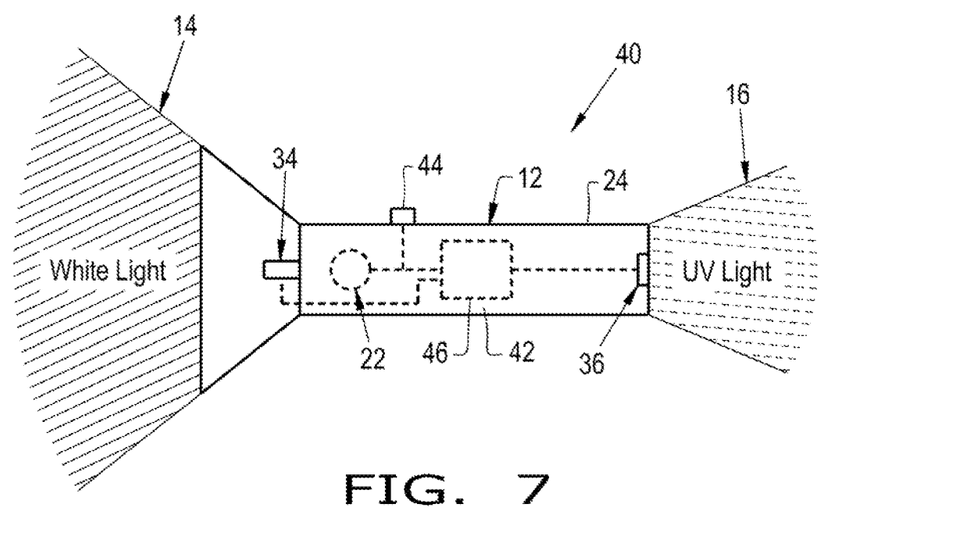
FIG. 7 is a schematic view of another embodiment of a lighting system, wherein the lighting system includes a control device for automatically activating the various lighting states of the lighting system.

Referring now to FIG. 7, there is shown another embodiment of a lighting system 40. The lighting system 40 may be substantially similar to the lighting system 30, except that the light source 12 is in the form of a flashlight 42 that is automatically controlled. The flashlight 42 can be switched in between its various lighting states via one or more light sensors 44 and a control device 46. The flashlight 42 may or may not include the switch 22 for optional manual control. Each light sensor 44 may be operably connected to the control device 46. Each light sensor 44 may be coupled to the body 24 of the flashlight 42 at any desired location. Each light sensor 44 may be in the form of an optical sensor for sensing ambient light around the individual and/or bicycle B. For example, each light sensor 44 may sense ambient daylight and/or artificial light, such as street lights or headlights of vehicles. Each light sensor 44 may provide a light signal to the control device 46. For instance, each light sensor 44 may send a well-lit signal to the control device 46 upon sensing a sufficient amount of ambient light. As used herein, the term sufficient amount of ambient light may refer to a level of ambient light wherein the reflected visible light 20 from the UV radiation absorbed by the reflectance material(s) 18 is not brighter than the surrounding ambient light.

The control device 46 may be operably connected to the visible and ultraviolet lights 34 and 36, the sensor(s) 44, and/or the switch 22 if included. The control device 46 may be located within the body 24 of the lighting device 42. The control device 46 may be in the form of an analog and/or digital control device, such as a microcontroller. The control device 46 can selectively activate the visible LEDs 34 and/or nonvisible LEDs 36, depending upon the light signal of the light sensor 44.

Figure 8:
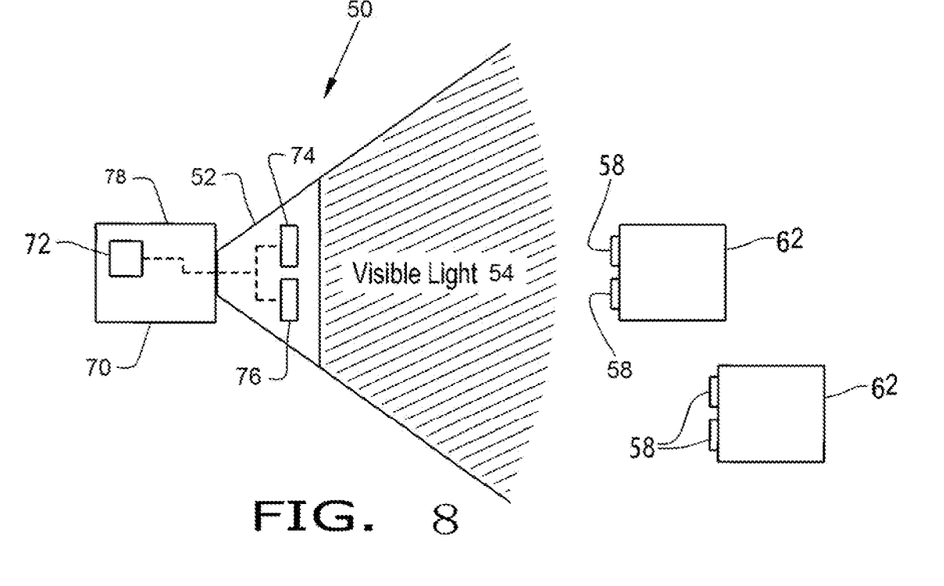
FIG. 8 is a schematic view of a lighting system according to an embodiment of the invention, wherein the lighting system is operating in a first strobing state for emanating visible light.
Figure 9:
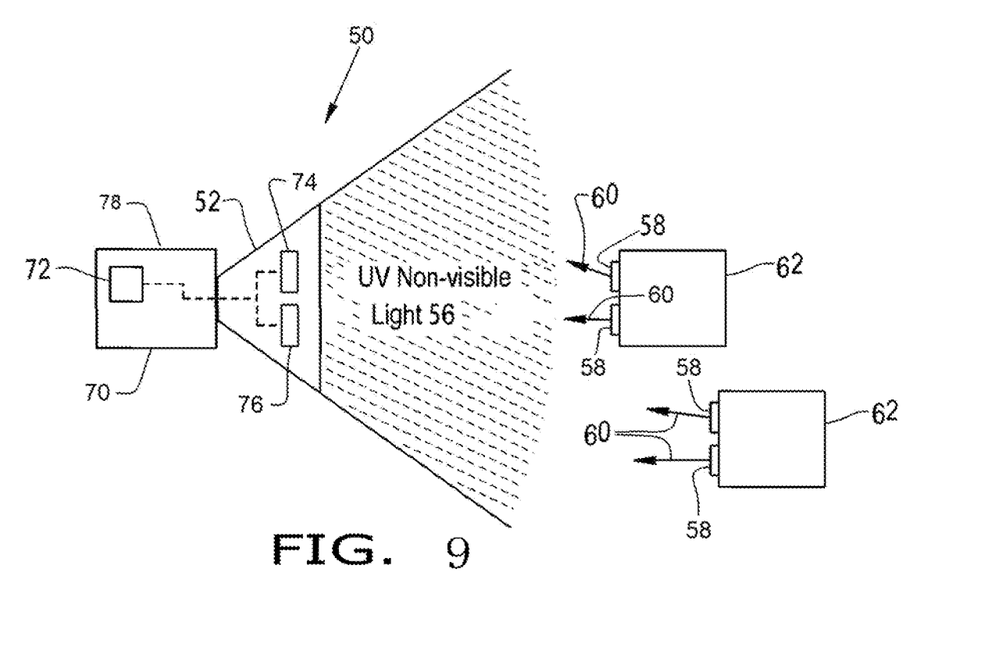
FIG. 9 is a schematic view of the lighting system of FIG. 1, wherein the lighting system is operating in a second strobing state for emanating ultraviolet light.

Turning now to FIGS. 8 and 9, there is shown, in a schematic form, another lighting system 50. The lighting system 50 generally includes a lighting device 52 that emits visible light 54 and non-visible light 56. The non-visible light 56 may be in the form of ultraviolet (UV) light 56. When UV light 56 illuminates and interacts with reflectance material(s) 58, the reflectance material(s) will 58 convert UV light 56 into visible light 60 to enhance the visibility of objects 62. A reflectance material 58 may again include any desired material, paint, coating, fabric, etc., which phosphors, i.e., emits visible light upon absorbing UV radiation. An object 62 may include any object or thing, personnel, and/or animal, including, for example, a safety vest of an individual, markings on a roadway or barrier, and a vehicle.

The lighting system 50 may be connected to or used in conjunction with an object 70. For instance, the lighting system 50 may be movably or fixedly connected to the object 70. The object 70 may be in the form of a safety, service, or work vehicle 70. Alternatively, the object 70 may be in the form of a stationary object, such as a barrier or lighting fixture. As shown, the object 70 is in the form of a vehicle 70 which includes a vehicle control unit (VCU) 72. Therein, the lighting system 50 may help to illuminate the operator or supporting personnel of the vehicle 70.

The lighting device 52 may or may not be operably coupled to the VCU 72 of the vehicle 70. The operation of the lighting device 52 may be controlled by the VCU 72. Alternatively, the lighting device 52 may include its own analog and/or digital control device and accompanying circuitry for controlling the operation thereof independently or in conjunction with the VCU 72. The control device of the lighting device 52 may be in the form of a switch which toggles the on and off conditions of the visible light 54 and UV light 56. The lighting device 52 may include its own power source, e.g. battery, and/or draw power from the vehicle 70 if it is coupled thereto.

The lighting device 52 may additionally include a body 78, e.g. housing, a light directing device. e.g. a lens, shield, reflector, or cone, at least one visible light source 74 for emitting visible light 54, and at least one UV light source 76 for emitting UV light 56. The lighting device 52 may be in the form of a light bar with numerous visible light sources 74 and UV light sources 76. The lighting device 52 may comprise any desired material.

The light sources 74 and 76 may be operably connected to one another. For example, the light sources 74 and 76 may be wirelessly connected to one another or connected to one another via a designated electrical line. It should be appreciated that the light sources 74 and 76 may be operably connected to one another by way of an independent connection to a control device and/or VCU 72 which controls the operation of the light sources 74 and 76. The light sources 74 and 76 may also be operably connected to the control device of the lighting device 52 and/or VCU 72. The light sources 74 and 76 may be in the form of any desired visible light(s) 74 and UV light(s) 76, respectively. For example, the lights 74 and 76 can in the form of light emitting diodes (LEDs). The LEDs may include a widened spectrum including UV light emitting sources and visual light emitting sources, for example, with a spectrum from 360 nm to 670 nm.

The lights 74 and 76 are connected to the body 78 of the lighting device 52. The lights 74 and 76 may be positioned within or on the body 78 of the lighting device 52 at any desired location. The lights 74 and 76 can be positioned on a common substrate or the same die. For example, the lights 74 and 76 can be arranged in a multi-die LED chip configuration with a single UV emitter in the middle and surrounded with adjacent visible light emitters. The light emanating from the lights 74 and 76 may be directed by the light directing device.

Lighting system 50 will light up or activate any reactive items having reflectance material(s) 58 like safety vests during this off mode of visible light 54 such that any items having reflectance material(s) 58 which are not presently illuminated by visible light 54 from the visible light(s) 74 will be illuminated by the UV light 56 from the UV light(s) 76. The lighting system 50 may operate in multiple states. For example, the lighting system 50 can operate in a single steady on state, a dual steady on state, and/or a strobing or flashing state. During the single steady on condition, the visible light(s) 24 of the lighting device 52 acts as a solid (continuous) light in the desired visible spectrum chosen. During the dual steady on condition, both of the lights 74 and 76 act as continuous lights for emanating visible light 54 and non-visible light 56. As soon as lighting device 52 is placed in a strobing or flashing state, during the "off" stage of visible light 54, UV light 56, outside of the visible range, is strobed "on" by the at least one UV light 76. Advantageously, this allows the introduction of a positive safety mode during a normal offstage of visible light 54. Additionally, advantageously, the energy of the system is conserved. Furthermore, the operational life of the UV light(s) 76 is prolonged.

The UV light(s) 76 may emanate UV light 56 in a wavelength range from 360 nm to 385 nm. For example, the UV light 56 can be emitted at a 365 nm wavelength. At the 365 nm wavelength, the lighting system 50 will not interfere with other lighting systems of other service vehicles or personnel. For instance, some service vehicles may include lighting systems that emit a blue light, and the UV light 56 will not interfere or be confused with such a wavelength of the lighting system 50.

Figure 10:
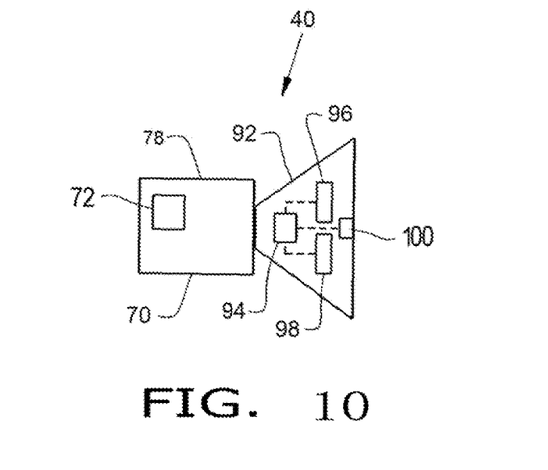
FIG. 10 is a schematic view of a lighting system according to another embodiment of the invention.

Referring now to FIG. 10, there is shown another embodiment of a lighting system 90. The lighting system 90 may be substantially similar to the lighting system 50 as described above, except that the lighting device 92 includes a control device 94 and at least one light sensor 100 in addition to the one or more visible light source(s) 96 and ultraviolet light source(s) 98, i.e.—light(s) 96 and 98. The control device 94 may be operably connected to the visible light source(s) 96 and ultraviolet light source(s) 98, the light sensor(s) 100, and/or the VCU 72. The control device 94 may be located within the body 78 of the lighting device 92. The control device 94 may be in the form of a switch, e.g. a relay switch, or a microcontroller. The control device 94 may be an analog and/or digital control device.

Each light sensor 100 may be operably connected to the control device 94. Each light sensor 100 may be in the form of an optical sensor for sensing ambient light around the object 72. For example, each light sensor 100 may sense ambient daylight and/or artificial light, e.g. street lights, lights of other service vehicles, etc. Each light sensor 100 may provide a light signal to the control device 94. For instance, each light sensor 100 may send a well-lit signal to the control device 94 upon sensing a sufficient amount of ambient light. As used herein, the term sufficient amount of ambient light may refer to a level of ambient light wherein the reflected light 20 from the UV radiation absorbed by the reflectance material(s) 18 is not brighter than the surrounding ambient light. In such a condition wherein there is sufficient ambient light, the control device 94 may continue to strobe the visible light source(s) 96 while maintaining the UV light source(s) 98 in an off state.

The control device 94 may be configured for selectively activating and/or directing UV light source(s) 98 at a particular area or location relative to the object 70 and/or all around the object 70. For example, the light sensor(s) 100 may identify one or more areas or locations, adjacent to the object 70, which may have less ambient light than another surrounding area. Thereafter, the control device 94 may direct the UV light specifically to this particular, relatively low-lit area. Thus, the control device 94 may optimize the effectiveness of the UV light source(s) 98 by radiating specific areas which may subject the object 70 and/or personnel to a more dangerous situation relative to surrounding relatively more well-lit areas.

Figure 11:
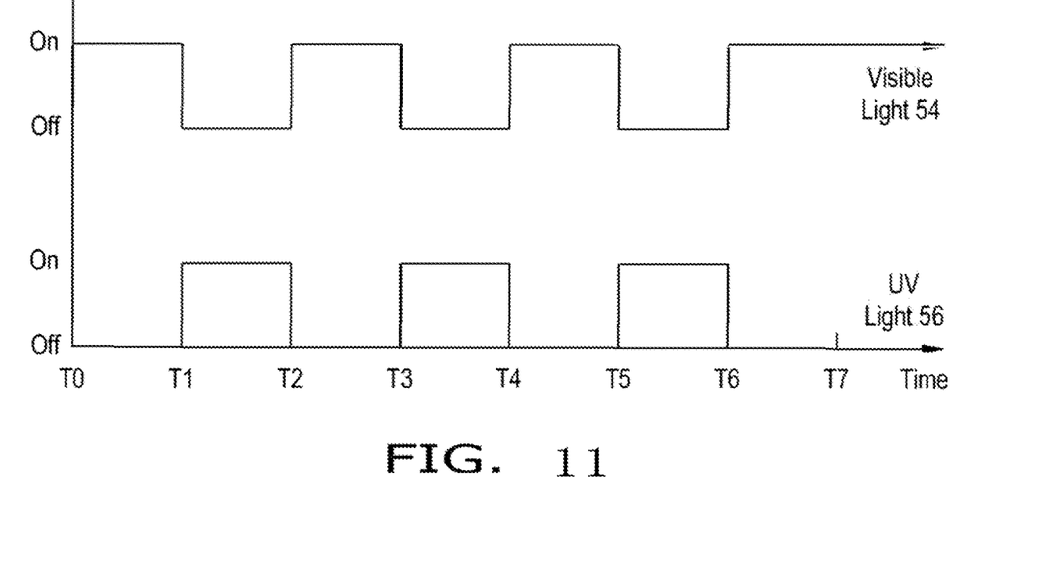
FIG. 11 is a diagram illustrating the timing of the first and second strobing states.

Now, additionally referring to FIG. 11, there is shown, in a schematical form, a simplified timing diagram of the lighting systems 50 and 90. As can be seen when visible light 54 is on, UV light 56 is off. At time T0 lighting device 52 is emitting visible light 54. At times T1, T3, and T5 visible light 54 is turned off and UV light 56 is turned on. In a contra sense, at times T2, T4 and T6 UV light 56 is turned off and visible light 54 is turned on. The timing and durations of these events can vary such that UV light 56 may be on for only a portion of the time visible light 54 is off. Further, it is also contemplated that UV light 56 may strobe multiple times during an off time of the visible light 54.

At time T7 visible light 54 remains constantly on and UV light 56 remains off, as lighting device 52 transitions to an on state, by either automatic selection or by the selection of an operator of lighting system 50 and/or 90. While not illustrated, when an operator selects an off state, both lights 54 and 56 are off. It should be appreciated that an operator of the lighting system 50 and/or 90 may control the operation of the lighting device 52 and/or 92, and/or the control device 94 and/or VCU 72 may control the operation of the lighting device 52 and/or 92.

Advantageously, the invention uses the off portion of a strobing visible light 54 to strobe UV light 56 on to enhance the visibility of the object 62. The invention can enhance the output of a lighting system in that the UV light 56 is only on during the time at which visible light 54 is off to thereby reduce power consumption rather than leaving a UV light on all of the time. Further, the light emitters, during the strobing phase (times T0-T6) are on only a portion of time, so that more light output may be possible during the on portions, with the light elements having a brief off, cooling state.

Figure 12:
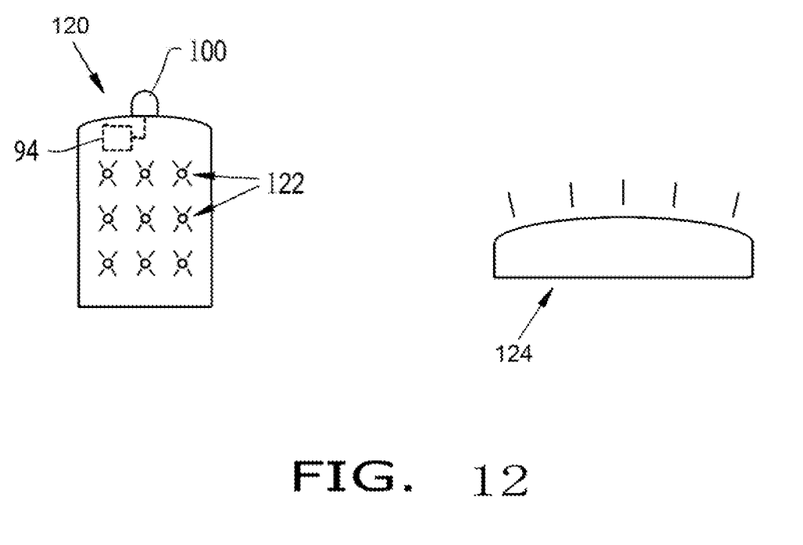
FIG. 12 is a schematic view of a lighting system according to another embodiment of the invention.

Referring now to FIG. 12, there is shown another embodiment of a lighting system 120. The lighting system 120 may include one or more visible and/or non-visible light source (s) 122, with one or more light sensors 100, which operate in tandem with one or more visible and/or non-visible light source(s) 124. For instance, the lighting system 120 may be similar to the lighting system 50 or the lighting system 90, except that the lighting system 120 does not include a visible light source 74 or 96. Hence, the lighting system 120 may be in the form of a stand-alone UV lighting system 120 which includes at least one non-visible light source 122 for emitting non-visible, e.g. UV, light.

The lighting system 120 may cooperate with one or more existing or additional visible light sources 124. The one or more existing visible light sources 124 may be in the form of ambient light, visible lights on the vehicle 70, and/or visible lights on another object. Advantageously, the lighting system 120 may eliminate the need for rewiring the electronics of the vehicle 70 because the lighting system 120 may operate in tandem with one or more existing flashers or strobes on the vehicle 70. It should be appreciated that the visible light source(s) 124 may or may not be coupled to the UV light source(s) 122.

Whether by actively sensing visible light and/or passively awaiting a signal from visible light source(s) 124, the lighting system 120 may turn the UV light source(s) 122 on or off depending upon the existing light source(s) 124. For instance, the lighting system 120 may include a control device 94 and at least one light sensor 100, as discussed above. Thereby, the lighting system 120 may sense visible light via the light sensor 100. Then, the control device 94 may accordingly time the UV light source(s) 122 to turn on when the light sensor 100 detects that the existing visible light 124 is turned off or when there is an insufficient amount of visible light. Additionally or alternatively, the lighting system 120 may turn the UV light source(s) 122 on or off upon receiving a signal from the existing visible light source 124, e.g. a strobe light. For instance, the existing visible light source 124 may emit a low-level electronic signal that tells the lighting system 120 when the visible light from the light source 124 is off or on. Hence, the visible light source 124 may electronically listen for the signal of the existing visible light source 124 and thereafter coordinate and time the firing of the UV light source(s) 122. Thereby, the UV light source 122 may be strobed in dependence upon the signal from the existing visible light source 124.

It should be appreciated that the lighting system 120 may be coupled to and powered by the vehicle 70. Additionally or alternatively, the lighting system 120 may be powered by its own power source, e.g. battery. It should also be appreciated that the that the lighting system 120 may also be configured for sensing or being signaled by an existing UV light source in order to alter the operation of the UV light source(s) 122. It should further be appreciated that the lighting system 120 may operate in a strobing state or a constant on state. In the strobing state, the UV light source 122 may be turned on and off in dependence upon an on or off state of the existing visible light source 124. In the constant on state, the UV light source 122 may remain on at all times unless an existing light source is sufficiently illuminating the surrounding area or object(s).

According to another aspect of the invention, the lighting system 120 may be configured as a monitoring system 120 which utilizes one or more visible lights 122, with one or more light sensors 100, which operate in tandem with one or more "smart" and/or "dumb" UV lights 124. Thereby, the lighting system 120 may include visible light source(s) 122, with one or more light sensors 100 attached thereto, and UV light(s) 124.

The monitoring system 120 may detect whether the surrounding area and/or objects are illuminated with light, and if not, the system may hit the area and/or objects with UV light. The monitoring system 120 may time the UV light source(s) 122 such that when other visible light and/or non-visible light strobes 124 are off, it fires the UV light into a respective zone. For example, if a truck has four amber strobes and they all fire at the same time they are leaving a hole of blackness during the off phase. In the dark phase or blackness, the system may fire the area with UV light. The control device 94 and/or the amber strobes may include software, e.g. algorithms, which alters the strobe moment forward or backward in time towards dark times or blackness such that the strobes can fill the black moments. Hence, the strobes on a truck could independently but intelligently adjust their firing in real time. A person looking at the flashing vehicle may not be affected by the strobes being in sync and/or out of sync. Thus, persons working around the truck do not work in dark zones because the whole truck is lit 100% of the time and all therearound. If the UV and visible light timing is mixed, then the smart strobe could monitor the zone and adjust the visible strobe and fire the UV light source as appropriate.

Figure 13:
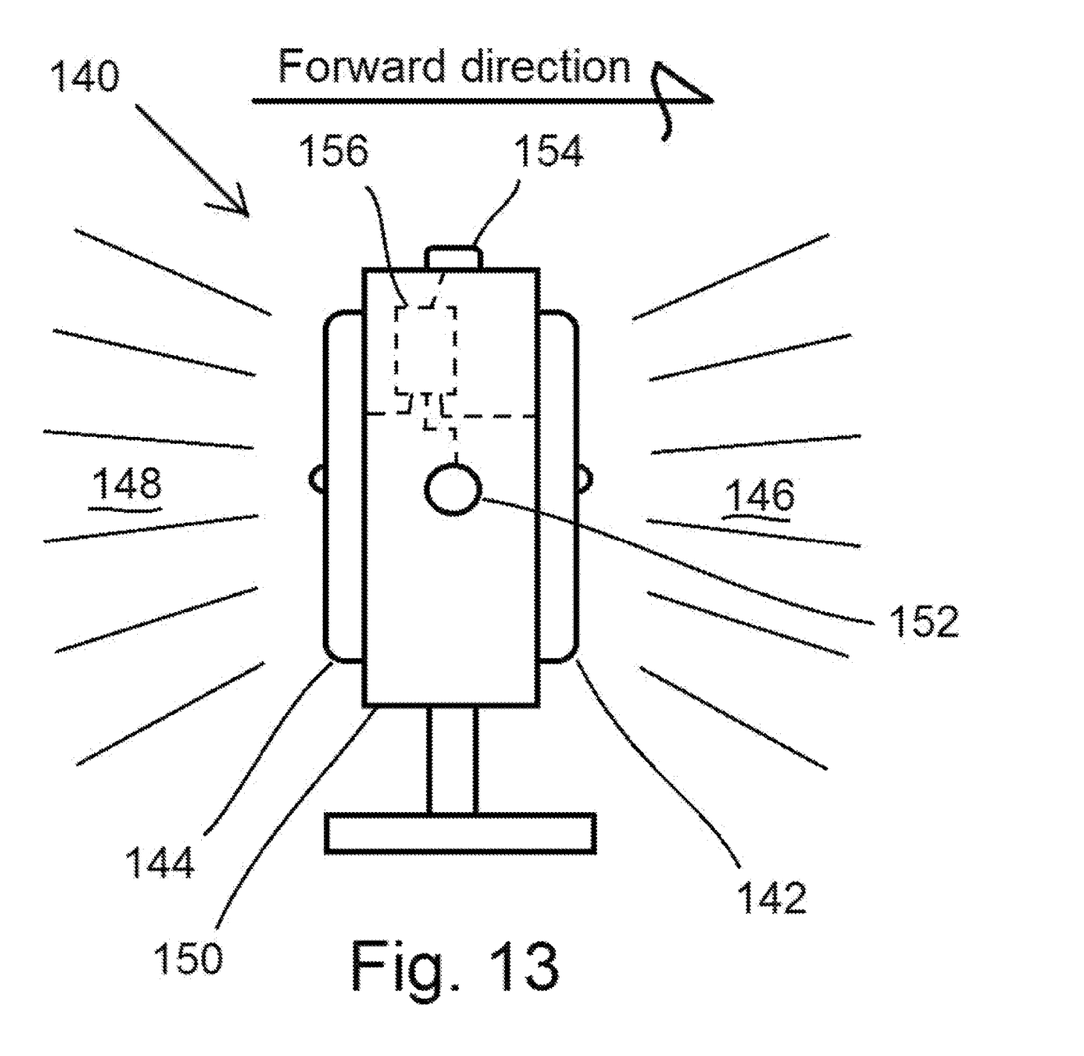
FIG. 13 is a schematic view of another embodiment of a lighting system, wherein the lighting system includes a control device for automatically activating the various lighting states of the lighting system.

Referring now to FIG. 13, there is shown another embodiment of a lighting system 140. The lighting system 140 may be substantially similar to the lighting systems 10, 30, 40, 50, 90, and/or 12, except that the body 150 is arranged so that visible light 146 is projected in a forward direction relative to the vehicle (not shown) to which it is attached, and so that non-visible or UV light 148 is projected in a rearward direction relative to the vehicle to which it is attached. The lighting system 140 may be automatically controlled, so that it can be switched in between its various lighting states via one or more light sensors 154. The lighting system 140 may or may not include a control switch or button 152 for optional manual control.

Each of the light sensor(s) 154, the control switch or button 152, a forward facing visible light source 142, and a rearward facing non-visible or UV light source 144 may be connected to a control device 156. The light sensor(s) 154 may be in the form of an optical sensor for sensing ambient light around the lighting system 140. As with previous embodiments, the light sensor(s) 154 may sense ambient daylight and/or artificial light, such as street lights or lights of vehicles. The light sensor 154 may again provide a light signal to the control device 156 indicating whether a sufficient amount of ambient light has been detected. Once again, the term sufficient amount of ambient light may refer to a level of ambient light wherein reflected visible light 20 from the UV radiation absorbed by any reflectance material(s) 18 is not brighter than the surrounding ambient light. Reflectance material 58 may again include any desired material, paint, coating, fabric, etc., which emits visible light upon absorbing UV radiation, which may then illuminate any object or thing, personnel, and/or animal, including, for example, a safety vest of an individual, markings on a roadway or barrier, and a vehicle.

The control device 156 may again be in the form of an analog and/or digital control device, such as a microcontroller. The control device 156 can selectively activate the forward facing visible light source 142 and/or rearward facing non-visible or UV light source 144, depending upon the light signal of the light sensor 154. Alternately, the lighting system 140 may or may not be operably connected to the VCU of a vehicle (not shown), so that operation of the forward facing visible light source 142 and/or rearward facing non-visible or UV light source 144 is controlled by the VCU. The lighting system 140 may again include its own power source, e.g. battery, and/or draw power from the vehicle to which it is attached. The forward facing visible light source 142 and/or rearward facing non-visible or UV light source 144 may again be in the form of any desired visible light(s) 142 and UV light(s) 144, respectively. For example, the forward facing visible light source 142 and/or rearward facing non-visible or UV light source 144 may be in the form of light emitting diodes (LEDs). The LEDs may again include a widened spectrum including UV light emitting sources and visual light emitting sources, for example, with a spectrum from 360 nm to 670 nm.

As with previous embodiments, the lighting system 140 may operate in multiple states. For example, the lighting system 140 can operate in a single steady on state, a dual steady on state, and/or a strobing or flashing state. During the single steady on condition, the forward facing visible light source(s) 142 acts as a solid (continuous) light in the desired visible spectrum chosen. During the dual steady on condition, both of the forward facing visible light source(s) 142 and the rearward facing non-visible or UV light source(s) 144 act as continuous lights for emanating visible light 146 in a forward direction and non-visible light or UV light 148 in a rearward direction.

When the lighting system 140 is placed in a strobing or flashing state, during the "off" stage of the forward facing visible light source(s) 142, the rearward facing non-visible or UV light source(s) 144 is strobed "on" by the control device 156. The timing and durations of these events can vary such that the rearward facing non-visible or UV light source(s) 144 may be on for only a portion of the time that the forward facing visible light source(s) 142 is off. Further, it is also contemplated that the rearward facing non-visible or UV light source(s) 144 may strobe multiple times during an off time of the forward facing visible light source(s) 142. This has the desired effect of causing the appearance of objects located rearward of the lighting system 140 to profoundly stand out visually to oncoming observers.

While this invention has been described with respect to at least one embodiment, the invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

REFERENCE NUMBER LISTING

B bicycle
10 lighting system
12 light source
14 visible light
16 non-visible light/UV light
18 reflectance material(s)
20 visible light
22 control/switch or button
24 body
30 lighting system
32 handheld flashlight
34 (visible) light(s)/LEDs
36 (UV) light(s)/LEDs
40 lighting system
42 flashlight
44 light sensor(s)
46 control device
50 lighting system
52 lighting device
54 visible light
56 non-visible light/UV light
58 reflectance material(s)
60 visible light
62 object
70 object
72 Vehicle Control Unit (VCU)
74 visible light source
76 UV light source
78 body
90 lighting system
92 lighting device
94 control device
96 visible light source
98 ultraviolet light source
100 light sensor
120 lighting system/monitoring system
122 visible and/or non-visible light source(s)
124 visible and/or non-visible light source(s)
140 lighting system
142 visible light source
144 non-visible/UV light source
146 visible light
148 non-visible light/UV light
150 body
152 control switch or button
154 light sensor(s)
156 control device

What is claimed is:

1. A lighting device configured to be attached to a transportation device, the lighting device comprising:
   a body;
   at least one forward facing visible light source connected to the body, the at least one forward facing visible light source being configured for emitting visible light in a forward direction relative to the transportation device;
   at least one rearward facing ultraviolet light source connected to the body, the at least one rearward facing ultraviolet light source being configured for emitting ultraviolet light in a rearward direction relative to the transportation device such that a reflectance material of an object, which is not being illuminated by the at least one forward facing visible light source, is illuminated by the at least one rearward facing ultraviolet light source;

a control device operably connected to the at least one forward facing visible light source and to the at least one rearward facing ultraviolet light source, the control device being configured for turning on and off the at least one forward facing visible light source and the at least one rearward facing ultraviolet light source; and at least one light sensor operably connected to the control device, the at least one light sensor being configured for sensing ambient light and for providing a signal to the control device, wherein the control device is configured for turning the at least one rearward facing ultraviolet light source on and off responsive to the signal of the at least one light sensor.

2. The lighting device of claim 1, wherein:
the control device is further configured for strobing the at least one forward facing visible light source and the at least one rearward facing ultraviolet light source by turning the at least one rearward facing ultraviolet light source on upon the at least one forward facing visible light source turning off and turning the at least one rearward facing ultraviolet light source off upon the at least one forward facing visible light source turning on.

3. The lighting device of claim 2, wherein:
the control device is further configured for strobing the at least one forward facing visible light source and maintaining the at least one rearward facing ultraviolet light source in an off state upon the at least one light sensor sensing a sufficient amount of ambient light.

4. The lighting device of claim 1, wherein:
the at least one light sensor is in the form of at least one optical sensor.

5. The lighting device of claim 1, wherein:
the control device is in the form of a microcontroller.

6. The lighting device of claim 1, wherein:
the at least one rearward facing ultraviolet light source emits ultraviolet light in a wavelength range from 360 nm to 385 nm.

7. The lighting device of claim 1, wherein:
the at least one rearward facing ultraviolet light source emits ultraviolet light at a wavelength of 365 nm.

8. A transportation device having a lighting device attached thereto, the lighting device comprising:
a body;
at least one forward facing visible light source connected to the body, the at least one forward facing visible light source being configured for emitting visible light in a forward direction relative to the transportation device;
at least one rearward facing ultraviolet light source connected to the body, the at least one rearward facing ultraviolet light source being configured for emitting ultraviolet light in a rearward direction relative to the transportation device such that a reflectance material of an object, which is not being illuminated by the at least one forward facing visible light source, is illuminated by the at least one rearward facing ultraviolet light source;
a control device operably connected to the at least one forward facing visible light source and the at least one rearward facing ultraviolet light source, the control device being configured for turning on and off the at least one forward facing visible light source and the at least one rearward facing ultraviolet light source; and at least one light sensor operably connected to the control device, the at least one light sensor being configured for sensing ambient light and providing a signal to the control device, wherein the control device is configured for turning the at least one rearward facing ultraviolet light source on and off responsive to the signal of the at least one light sensor.

9. The transportation device of claim 8, wherein:
the control device is further configured for strobing the at least one forward facing visible light source and the at least one rearward facing ultraviolet light source by turning the at least one rearward facing ultraviolet light source on upon the at least one forward facing visible light source turning off and turning the at least one rearward facing ultraviolet light source off upon the at least one forward facing visible light source turning on.

10. The transportation device of claim 9, wherein:
the control device is further configured for strobing the at least one forward facing visible light source and maintaining the at least one rearward facing ultraviolet light source in an off state upon the at least one light sensor sensing a sufficient amount of ambient light.

11. The transportation device of claim 8, wherein:
the at least one light sensor is in the form of at least one optical sensor.

12. The transportation device of claim 8, wherein:
the control device is in the form of a microcontroller.

13. The transportation device of claim 8, wherein:
the at least one rearward facing ultraviolet light source emits ultraviolet light in a wavelength range from 360 nm to 385 nm.

14. The transportation device of claim 8, wherein:
the at least one rearward facing ultraviolet light source emits ultraviolet light at a wavelength of 365 nm.

15. A method for illuminating at least one of an area and an object, comprising:
providing a transportation device and a lighting device attached to the transportation device, the lighting device comprising a body, at least one forward facing visible light source connected to the body, and at least one rearward facing ultraviolet light source connected to the body;
operably connecting a control device to the at least one forward facing visible light source and to the at least one rearward facing ultraviolet light source;
configuring the control device for turning on and off the at least one forward facing visible light source and the at least one rearward facing ultraviolet light source;
operably connecting at least one light sensor to the control device;
configuring the at least one light sensor for sensing ambient light and for providing a signal to the control device;
configuring the control device for turning the at least one rearward facing ultraviolet light source on and off responsive to the signal of the at least one light sensor;
emitting visible light in a forward direction relative to the transportation device by activating the at least one forward facing visible light source; and
emitting ultraviolet light in a rearward direction relative to the transportation device by activating the at least one rearward facing ultraviolet light source such that a reflectance material of the object, which is not being illuminated by the at least one forward facing visible light source, is illuminated by the at least one rearward facing ultraviolet light source.

16. The method of claim 15, further comprising the steps of:
configuring the control device for strobing the at least one forward facing visible light source and the at least one rearward facing ultraviolet light source by turning the at least one rearward facing ultraviolet light source on upon the at least one forward facing visible light source turning off and turning the at least one rearward facing ultraviolet light source off upon the at least one forward facing visible light source turning on.

17. The method of claim 16, further comprising the steps of:
configuring the control device for strobing the at least one forward facing visible light source and maintaining the at least one rearward facing ultraviolet light source in an off state upon the at least one light sensor sensing a sufficient amount of ambient light.

18. The method of claim 15, wherein:
the at least one light sensor is in the form of at least one optical sensor.

19. The method of claim 15, wherein:
the control device is in the form of a microcontroller.

20. The method of claim 1, wherein:
the at least one rearward facing ultraviolet light source emits ultraviolet light in a wavelength range from 360 nm to 385 nm.

\* \* \* \* \*